US011503176B2

(12) United States Patent
Sheng

(10) Patent No.: US 11,503,176 B2
(45) Date of Patent: Nov. 15, 2022

(54) SCANNER WITH CUFF-SHEET TYPE GUIDING STRUCTURE COMPRISING A FIRST SHEET DISPOSED ON A TRANSPARENT PLATEN THAT IS THICKER THAN A SECOND SHEET DISPOSED ON THE TRANSPARENT PLATEN TO FORM THE CUFF-SHEET TYPE GUIDING STRUCTURE

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 17/518,784

(22) Filed: Nov. 4, 2021

(65) Prior Publication Data

US 2022/0174174 A1 Jun. 2, 2022

(30) Foreign Application Priority Data

Dec. 1, 2020 (TW) .................................. 109142143

(51) Int. Cl.
*H04N 1/00* (2006.01)
*H04N 1/12* (2006.01)
(Continued)

(52) U.S. Cl.
CPC ....... *H04N 1/1235* (2013.01); *H04N 1/00018* (2013.01); *H04N 1/00045* (2013.01);
(Continued)

(58) Field of Classification Search
CPC ........... H04N 1/00018; H04N 1/00045; H04N 1/047; H04N 1/1061; H04N 1/123; H04N 1/1235; H04N 1/00588; H04N 2201/0081
(Continued)

(56) References Cited

U.S. PATENT DOCUMENTS 6,512,602 B1 * 1/2003 Sheng ................ H04N 1/00615
271/3.14
8,072,655 B2 * 12/2011 Park ....................... H04N 1/123
399/361
(Continued)

FOREIGN PATENT DOCUMENTS

CN 1273181 A * 11/2000
CN 107635085 A 1/2018
(Continued)

*Primary Examiner* — Chad Dickerson
(74) *Attorney, Agent, or Firm* — Muncy, Geissler, Olds & Lowe, P.C.

(57) ABSTRACT

A scanner includes: a first body having a window and a guide structure; a transparent platen connected to the first body to cover the window; a first sheet disposed on the transparent platen and in the window; a second sheet fixedly disposed on the transparent platen, in the window and on the guide structure, wherein the first sheet is thicker than the second sheet to form a cliff-sheet type guiding structure as a first part of a transporting passage; a scanning module disposed in the first body; a second body having a second part of the transporting passage; and a transporting mechanism being disposed in the second body and transporting a document along the transporting passage, so that the scanning module scans an image of the document through the window.

12 Claims, 5 Drawing Sheets

(51) Int. Cl.
*H04N 1/047* (2006.01)
*H04N 1/10* (2006.01)

(52) U.S. Cl.
CPC ........... *H04N 1/047* (2013.01); *H04N 1/1061* (2013.01); *H04N 1/123* (2013.01)

(58) Field of Classification Search
USPC ........................................ 358/497, 498, 474
See application file for complete search history.

(56) References Cited

U.S. PATENT DOCUMENTS

| | | | |
|---|---|---|---|
| 9,948,814 B2 * | 4/2018 | Sheng | .................. H04N 1/1061 |
| 2009/0262401 A1 | 10/2009 | Sheng | |
| 2018/0020114 A1 | 1/2018 | Sheng et al. | |

FOREIGN PATENT DOCUMENTS

| | | | |
|---|---|---|---|
| TW | 537302 U | 6/2003 |
| TW | 543551 U | 7/2003 |
| TW | 200945876 A | 11/2009 |

* cited by examiner

SCANNER WITH CUFF-SHEET TYPE GUIDING STRUCTURE COMPRISING A FIRST SHEET DISPOSED ON A TRANSPARENT PLATEN THAT IS THICKER THAN A SECOND SHEET DISPOSED ON THE TRANSPARENT PLATEN TO FORM THE CUFF-SHEET TYPE GUIDING STRUCTURE

CROSS-REFERENCE TO RELATED APPLICATIONS

This application claims priority of No. 109142143 filed in Taiwan R.O.C. on Dec. 1, 2020 under 35 USC 119, the entire content of which is hereby incorporated by reference.

BACKGROUND OF THE INVENTION

Field of the Invention

This disclosure relates to a scanner, and more particularly to a scanner with a cliff-sheet type guiding structure.

Description of the Related Art

A conventional scanner is composed of a flatbed scanner and an automatic sheet feeder. A user can place a document on the flatbed scanner to perform the flatbed scanning, and can also place documents into the automatic sheet feeder to perform multi-document scanning.

FIGS. 1A and 1B are partially enlarged schematic views showing two states of a conventional scanner. Referring to FIG. 1A, China Patent No. CN107635085A discloses a scanner 200, wherein a scanning module 210 is disposed in a first body 220, a transparent substrate 260 is combined with the first body 220, a first sheet 240 is attached to the transparent substrate 260, and a second sheet 250 is attached to a second body 230.

Referring to FIG. 1B, the second body 230 may be opened or lifted and thus separated from the first body 220. At this time, the second sheet 250 attached to the second body 230 is also lifted with the lifting of the second body 230. When the second body 230 is opened, the free end of the second sheet 250 latest leaves the transparent substrate 260. When the second body 230 is closed, the free end of the second sheet 250 first contacts the transparent substrate 260. So, after the scanner 200 has been used for a period of time, the second sheet 250 may have the nonuniform deformation after the second body 230 has been opened and closed multiple times. Alternatively, when the second sheet 250 is lifted, it may be touched by the user and thus have deformation or offset to affect the sheet guiding function to cause the paper jam. This problem needs to be solved.

BRIEF SUMMARY OF THE INVENTION

It is therefore an objective of this disclosure to provide a scanner with a cliff-sheet type guiding structure, wherein a sheet for guiding a document out is fixed to a first body, and cannot leave the first body when a second body is lifted or opened.

To achieve the above-identified object, this disclosure provides a scanner including: a first body having a window and a guide structure; a transparent platen connected to the first body to cover the window; a first sheet disposed on the transparent platen and in the window; a second sheet fixedly disposed on the transparent platen, in the window and on the guide structure, wherein the first sheet is thicker than the second sheet to form a cliff-sheet type guiding structure as a first part of a transporting passage; a scanning module disposed in the first body; a second body having a second part of the transporting passage; and a transporting mechanism being disposed in the second body and transporting a document along the transporting passage, so that the scanning module scans an image of the document through the window.

With the above-mentioned embodiment, the cliff-sheet type guiding structure fixed to the first body can be used to make the document pass the window (or a gap) smoothly and be scanned, and the cliff-sheet type guiding structure is free from being damaged, deformed or offset, so that the scan quality, durability and stability can be effectively enhanced.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1A:
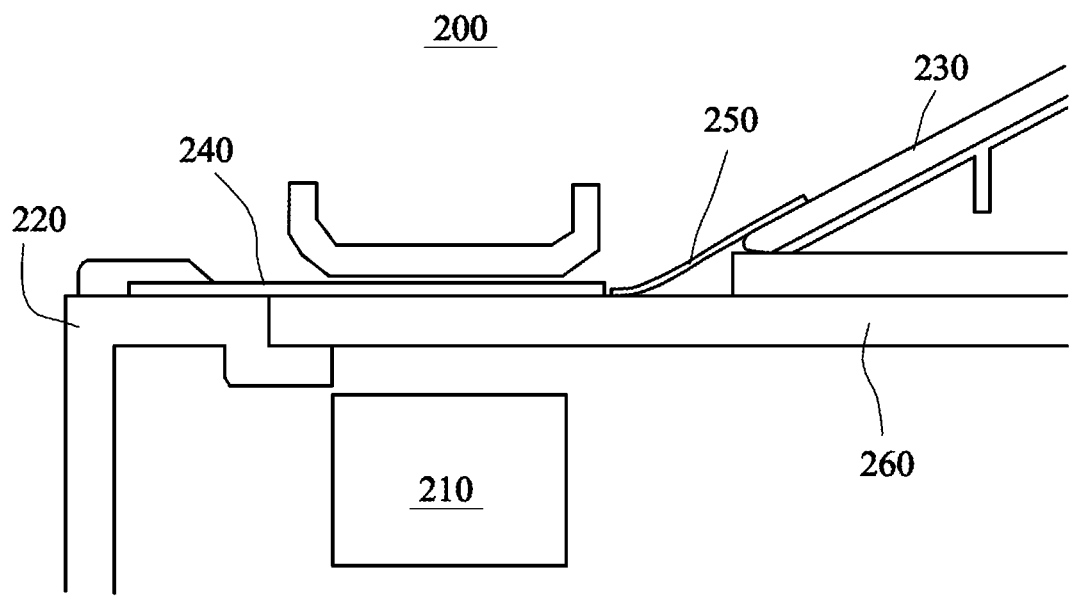
FIGS. 1A and 1B are partially enlarged schematic views showing two states of a conventional scanner.
Figure 1B:
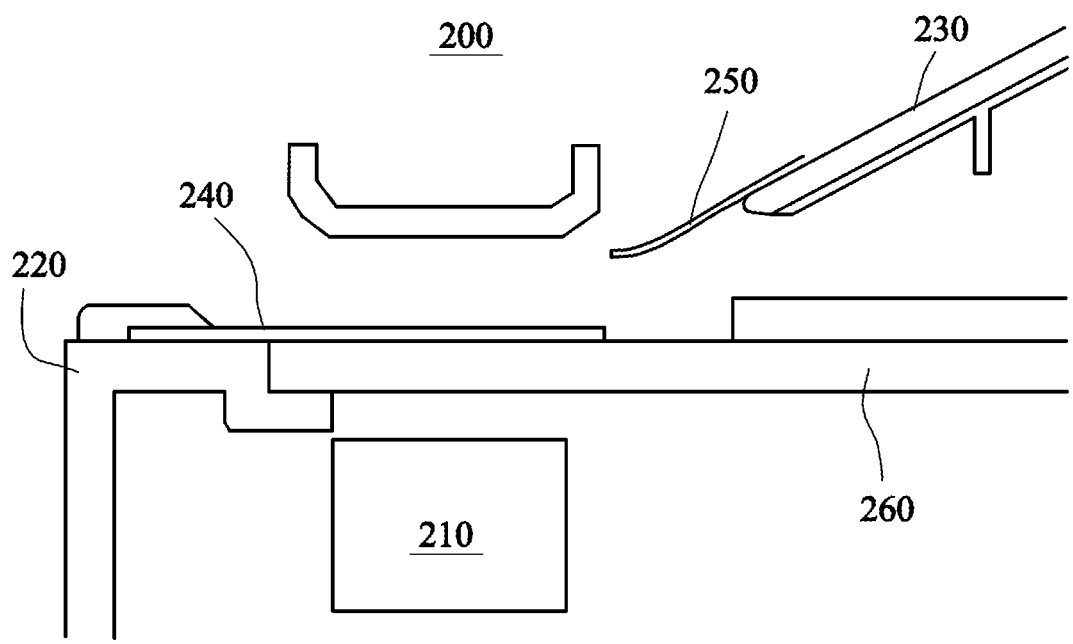
Figure 2:
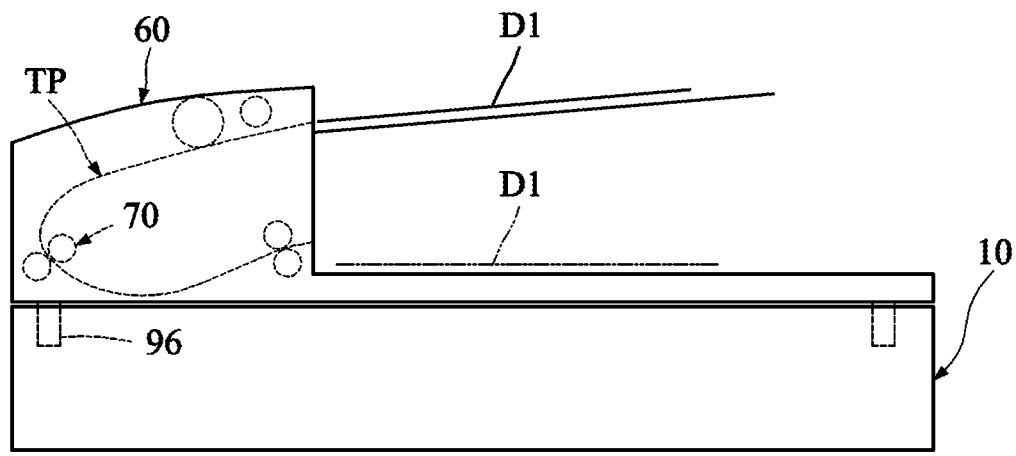
FIG. 2 is a schematic outlook view showing a closed state of a scanner according to a preferred embodiment of this disclosure.
Figure 3:
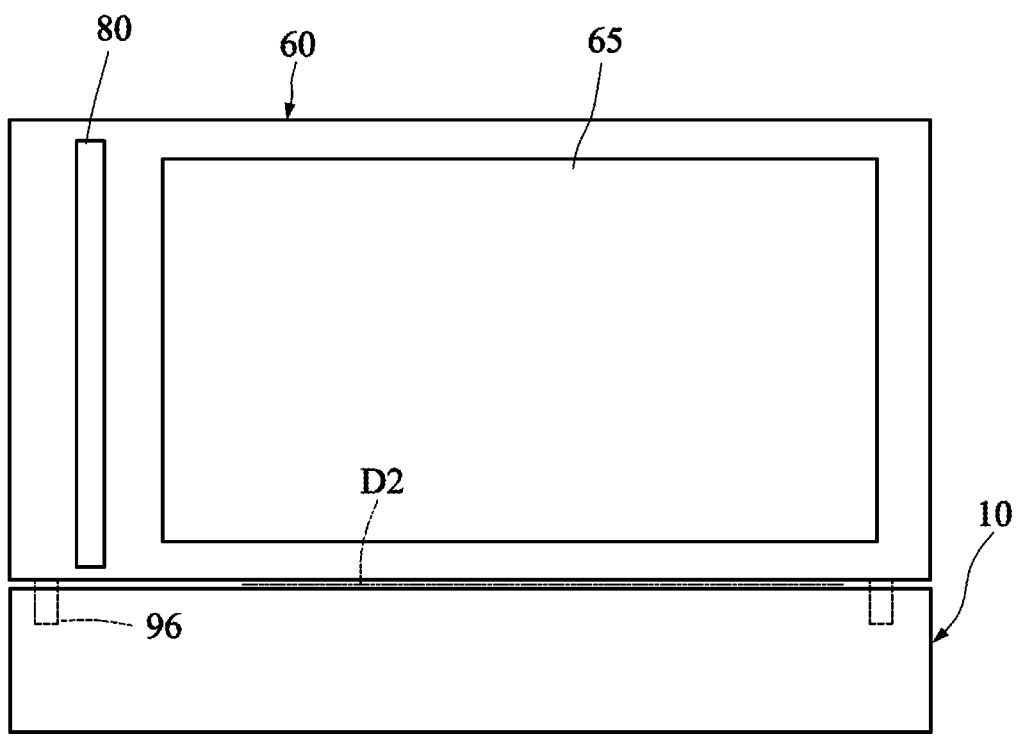
FIG. 3 is a schematic outlook view showing an opened state of the scanner according to the preferred embodiment of this disclosure.

FIG. 2 is a schematic outlook view showing a closed state of a scanner according to a preferred embodiment of this disclosure. FIG. 3 is a schematic outlook view showing an opened state of the scanner according to the preferred embodiment of this disclosure. Referring to FIGS. 2 and 3, this embodiment provides a scanner 100 including a first body 10 and a second body 60. The first body 10 is configured as a flatbed scanner, and the second body 60 is configured as an automatic document feeder and has a transporting passage TP and a transporting mechanism 70, which is only depicted in FIG. 2, includes rollers and transports a document D1 along the transporting passage TP so that the sheet-fed scan can be performed and the scanned document D1 can be stored in a lower part of the second body 60. The second body 60 is pivotally connected to the first body 10 through hinges 96, so that the user can open the second body 60 and then place a second document D2 to perform the flatbed scan. Alternatively, when the second document D2 is a book, a document presser 65 presses the second document D2, and the second body 60 can be lifted away from the first body 10 by a distance.

Figure 4A:
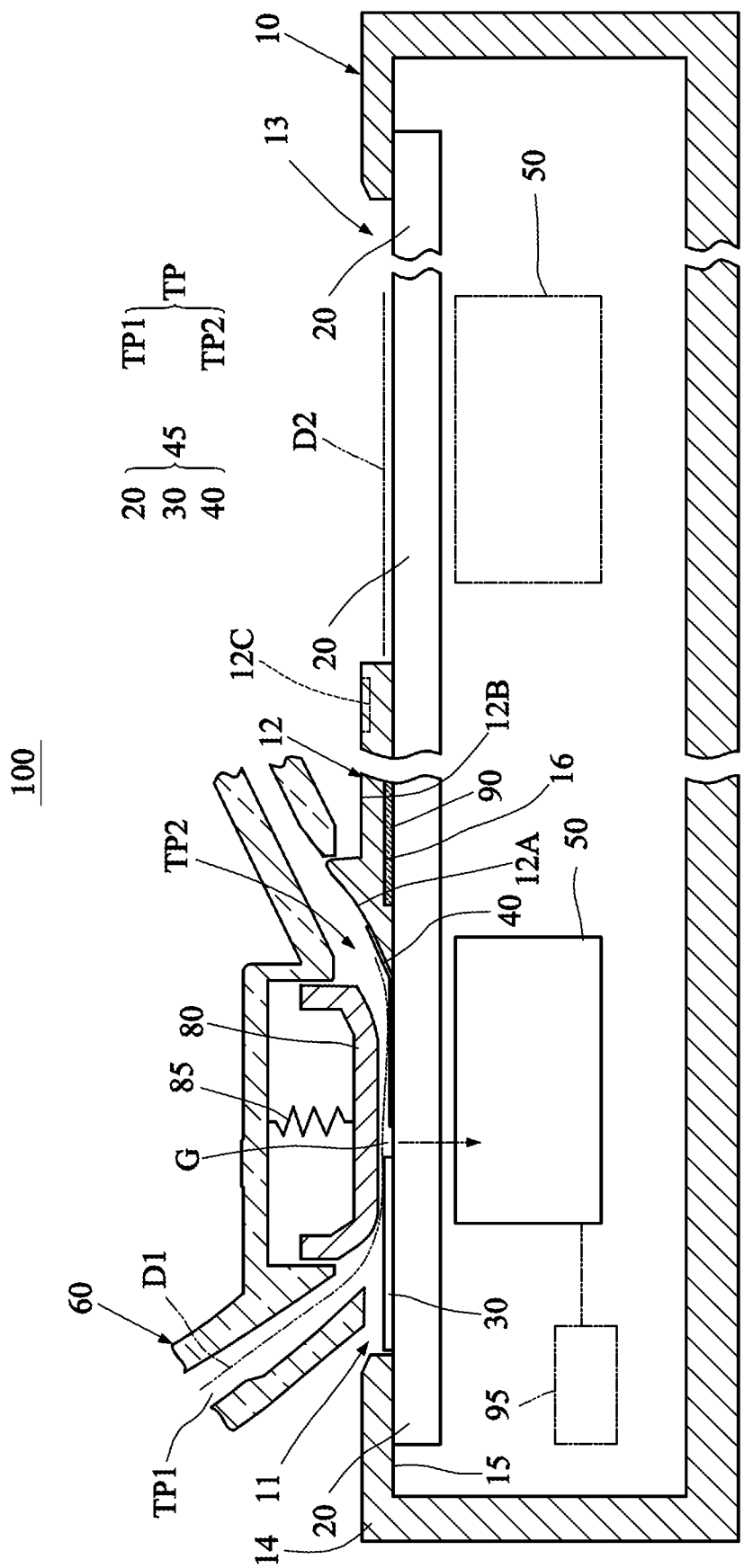
FIGS. 4A and 4B are schematically cross-sectional views showing two states of the scanner according to the preferred embodiment of this disclosure.
Figure 4B:
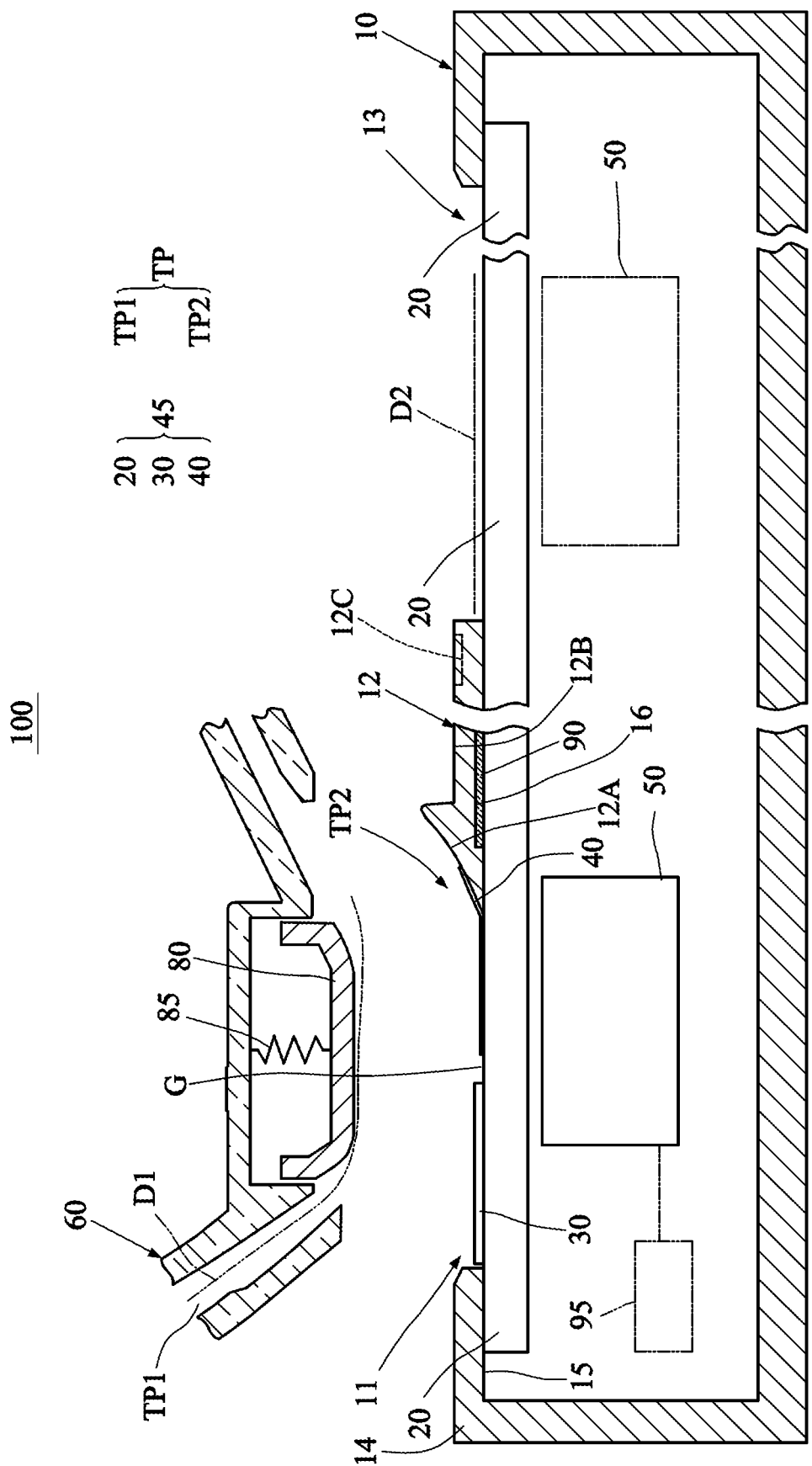

FIGS. 4A and 4B are schematically cross-sectional views showing two states of the scanner according to the preferred embodiment of this disclosure. Referring to FIGS. 2, 3, 4A and 4B, the scanner 100 of this embodiment includes the first body 10, a transparent platen 20, a first sheet 30, a second sheet 40, a scanning module 50, the second body 60 and the transporting mechanism 70.

The first body 10 has a window 11 and a guide structure 12. The transparent platen 20 is connected to the first body 10 to cover the window 11. The first sheet 30 is disposed on the transparent platen 20 and in the window 11. The second sheet 40 is fixedly disposed on the transparent platen 20, in the window 11, and on the guide structure 12. A gap G is disposed between the first sheet 30 and the second sheet 40. The first sheet 30 and the second sheet 40 are in physical surface contact with the transparent platen 20, so that the transparent platen 20 provides physical surface supports to the first sheet 30 and the second sheet 40. The physical surface supports function in conjunction with a condition that the first sheet 30 is thicker than the second sheet 40 to form a stable cliff-sheet type guiding structure 45 as a first part TP1 of the transporting passage TP. In one example, the first sheet 30 and the second sheet 40 may be adhered to the transparent platen 20.

The scanning module 50 is disposed in the first body 10. The second body 60 has a second part TP2 of the transporting passage TP. The transporting mechanism 70 disposed in the second body 60 transports the document D1 along the transporting passage TP, so that the scanning module 50 scans an image of the document D1 (an image representative of the document D1) through the window 11. More particularly, the scanning module 50 scans the image of the document D1 through the gap G. In this case, the transmittance of each of the first sheet 30 and the second sheet 40 is not restricted. That is, the first sheet 30 and the second sheet 40 may be transparent or opaque. The advantage obtained by scanning the document D1 through the gap G is that the document D1 is free from contacting the transparent platen 20 in the gap G to prevent the transparent platen 20 from being worn by the document D1 and prevent the scan quality from being disadvantageously deteriorated. When the document D1 is transported past the first sheet 30, a height difference is formed between the first sheet 30 and the second sheet 40, the document D1 may fly across the gap G and then reach the second sheet 40. Then, the second sheet 40 guides the document D1 to the guide structure 12. Then, the document D1 is entirely transported out of the transporting passage TP. Because of the presence of the gap G, the scanning module 50 can scan the document D1 without the optical path passing through the first sheet 30, and this is advantageous to the enhancement of the image scan quality.

The hinges 96 can be used so that the second body 60 is pivotally disposed on the first body 10. In this embodiment, because the second sheet 40 is fixed onto the transparent platen 20, the second sheet 40 cannot be moved with the movement of the second body 60 when the second body 60 is opened or lifted from the first body 10, as shown in FIG. 4B. Consequently, the second sheet 40 is free from deformation or offset with the elapse of the time, and free from being damaged by the user's inadvertent touch.

In addition, the scanner 100 may further include a pressing element 80, which is elastically movably disposed in the second body 60 through an elastic member 85, is disposed opposite the gap G, and restricts the document D1 from being moved in a direction toward the pressing element 80. When the front edge of the document D1 flies across the gap G, the front edge of the document D1 may warp up because no upward force is exerted on the front edge of the document D1. The pressing element 80 covers the range of the gap G, so that the document D1 cannot significantly warp up to affect the scan quality.

Furthermore, the transparent platen 20 is disposed on an inner surface 15 of an edge part 14 of the first body 10 and a lower surface 16 of the guide structure 12, and a step or a height difference is formed between the first sheet 30 and the edge part 14, so that the partial structure of the second body 60 of the transporting passage IP can be conveniently defined as being accommodated and positioned within the step.

The mechanism and the structural design can provide the sheet-fed scan function, and further provide the non-essential flatbed scan function. In this case, the first body 10 further has a second window 13, the guide structure 12 is disposed between the window 11 and the second window 13, and the transparent platen 20 covers the second window 13.

In the sheet-fed scanning case, the scanner 100 may further include a calibration sheet 90 and a driving mechanism 95. The calibration sheet 90 is disposed on the lower surface 16 of the guide structure 12 and the transparent platen 20. The driving mechanism 95 drives the scanning module 50 to move to a location under the calibration sheet 90 to scan the calibration sheet 90 for calibration, and then drives the scanning module 50 to move to a location under the gap G to scan the document D1.

In the flatbed scanning case, the driving mechanism 95 may further drive the scanning module 50 to move to a location under the second window 13 to scan the image of the second document D2 placed in the second window 13 and on the transparent platen 20.

In this embodiment, the guide structure 12 includes a rising part 12A and a flat part 12B. The second sheet 40 is partially disposed on the rising part 12A. The flat part 12B is connected to the rising part 12A. The height of the flat part 12B ranges between a minimum height and a maximum height of the rising part 12A. An indication mark 12C, such as A4-size or Letter-size document alignment icons, texts or the like, may be disposed on the flat part 12B to indicate the user to place the second document D2 in the second window 13 and on the transparent platen 20. The guide structure 12 and the overall first body 10 can be integrally formed together by way of plastic injection molding to simplify the manufacturing process; or may also be separate members without any limitation.

Three groups of samples listed in Table 1 are used in conjunction with paper sheets with the specifications of 60, 70, 80 and 105 grams per square meter (GSM), and the experimental test results can be summarized in the following. The first group of samples encounter the paper jam. The second group of samples only allow the paper sheet with 105 GSM to pass, but the obtained front end images are poor. The third group of samples allow the paper sheets with 60, 70, 80 and 105 GSM to pass, wherein the obtained Gray 600 MTF values range between 70% and 80%, the obtained Color 600 MTF values range between 36% and 48%, the obtained Color 300 MTF values range between 63% and 72%, and the obtained images are acceptable.

TABLE 1

| Group | Thickness of first sheet | Thickness of second sheet | Width of gap |
|---|---|---|---|
| 1 | 0.25 mm | 0.05 mm | 1.4 mm to 1.6 mm |
| 2 | 0.25 mm | 0.1 mm | 1.4 mm to 1.6 mm |
| 3 | 0.35 mm | 0.1 mm | 1.4 mm to 1.6 mm |

Figure 5A:
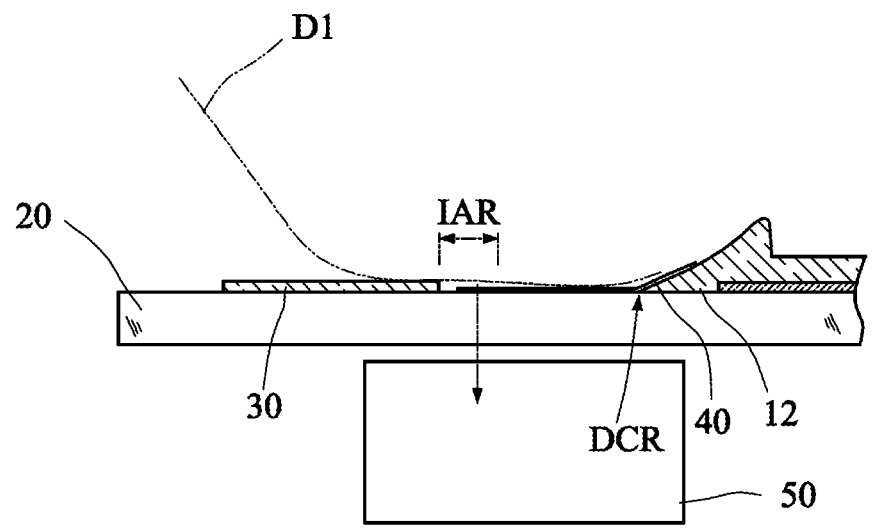
FIGS. 5A and 5B are schematically partial cross-sectional views showing two modified examples of FIG. 4A.
Figure 5B:
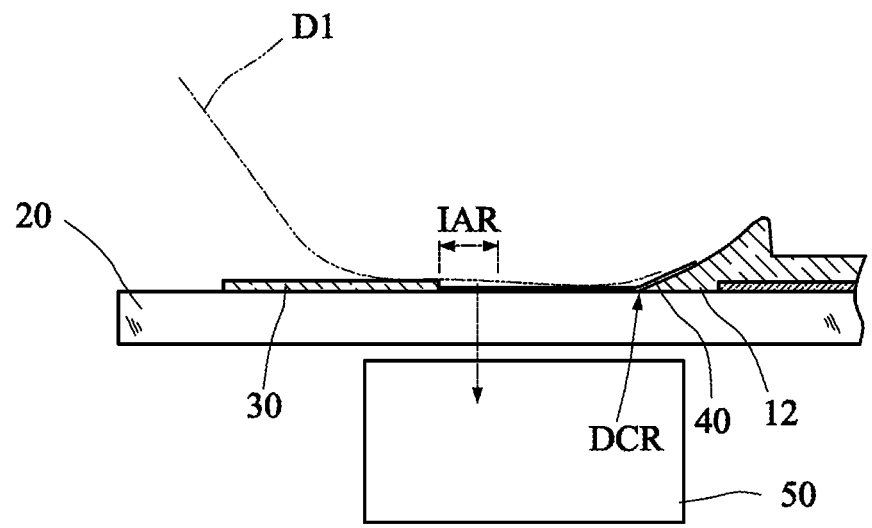

FIGS. 5A and 5B are schematically partial cross-sectional views showing two modified examples of FIG. 4A. FIGS. 5A and 5B are similar to FIG. 4A except for the difference that the scanning module 50 of FIGS. 5A and 5B scans the image of the document D1 through the second sheet 40. Thus, the transmittance of the second sheet 40 needs to be selected. In FIG. 5A, the first sheet 30 is close to the second sheet 40 with a gap formed therebetween. In FIG. 5B, the first sheet 30 is adjacent to the second sheet 40 without any gap formed therebetween. Thus, in FIG. 5A, the manufacturing cost can be reduced because it is unnecessary to control the precision of the gap to make the scanning module 50 perform scanning: and in FIG. 5B, the second sheet 40 can rest against the edge of the first sheet 30, so that the second sheet 40 can be conveniently adhered, and the manufacturing cost can also be reduced.

In FIGS. 5A and 5B, because a junction DCR between the guide structure 12 and the transparent platen 20 has a discontinuous connection step, the running document D1 tends to encounter the paper jam at the junction DCR. In order to solve this problem, the second sheet 40 is disposed to provide the integral adaptation for the junction DCR and solve the paper jam problem. In addition, in order to prevent the left end or front end of the second sheet 40 (the junction between the second sheet 40 and the transparent platen 20) from causing the paper jam, the first sheet 30 is disposed. The first sheet 30 is thicker than the second sheet 40 to provide the paper guiding function and action when the document D1 runs. Because a height difference is formed between the first sheet 30 and the second sheet 40, a part of the running document D1 in a predetermined range cannot be in friction contact with the transparent platen 20, the first sheet 30 and the second sheet 40 when the document D1 flies across the height difference, and this range is suitable for the image acquiring region IAR, so that the scanning module 50 can scan or acquire the image of the document D1 through the image acquiring region IAR. The above-mentioned configuration has the advantages of avoiding wear in the image acquiring region IAR, and only needing to clear the image acquiring region IAR if external dusts or paper flakes fall into the image acquiring region IAR. Alternatively, when the document D1 causes the serious wear to a part of the first sheet 30 and a part of the second sheet 40 other than the image acquiring region IAR, only the first sheet 30 and the second sheet 40 need to be replaced without the replacement of the entire transparent platen 20. Thus, it is very convenient in both the cleaning process and the maintenance.

With the above-mentioned embodiment, the cliff-sheet type guiding structure fixed to the first body can be used to make the document pass the window (or a gap) smoothly and be scanned, and the cliff-sheet type guiding structure is free from being damaged, deformed or offset, so that the scan quality, durability and stability can be effectively enhanced.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A scanner, comprising:
    a first body having a window and a guide structure;
    a transparent platen connected to the first body to cover the window;
    a first sheet disposed on the transparent platen and in the window;
    a second sheet fixedly disposed on the transparent platen, in the window and on the guide structure, wherein the first sheet and the second sheet are in physical surface contact with the transparent platen, so that the transparent platen provides physical surface supports to the first sheet and the second sheet, and the physical surface supports function in conjunction with a condition that the first sheet is thicker than the second sheet to form a cliff-sheet type guiding structure as a first part of a transporting passage;
    a scanning module disposed in the first body;
    a second body having a second part of the transporting passage; and
    a transporting mechanism being disposed in the second body and transporting a document along the transporting passage, so that the scanning module scans an image of the document through the window.

2. The scanner according to claim 1, wherein the second body is pivotally disposed on the first body, and when the second body is opened or lifted from the first body, the second sheet does not move with movement of the second body.

3. The scanner according to claim 1, wherein the transparent platen is disposed on an inner surface of an edge part of the first body and a lower surface of the guide structure, and a step is formed between the first sheet and the edge part.

4. The scanner according to claim 1, wherein a gap is disposed between the first sheet and the second sheet, so that the scanning module scans the image of the document through the gap.

5. The scanner according to claim 4, further comprising a pressing element, which is elastically movably disposed in the second body, is disposed opposite the gap, and restricts the document from moving in a direction toward the pressing element.

6. The scanner according to claim 4, wherein the first body further has a second window, the guide structure is disposed between the window and the second window, and the transparent platen covers the second window.

7. The scanner according to claim 6, further comprising:
    a calibration sheet disposed on a lower surface of the guide structure and the transparent platen; and
    a driving mechanism driving the scanning module to move to a location under the calibration sheet and to scan the calibration sheet for calibration, and then driving the scanning module to move to a location under the gap to scan the document.

8. The scanner according to claim 7, wherein the driving mechanism further drives the scanning module to move to a location under the second window to scan an image of a second document placed in the second window and on the transparent platen.

9. The scanner according to claim 6, wherein the guide structure comprises: a rising part, wherein the second sheet is partially disposed on the rising part; and a flat part connected to the rising part, and a height of the flat part ranges between a minimum height and a maximum height of the rising part.

10. The scanner according to claim 9, wherein an indication mark is disposed on the flat part to indicate a user to place a second document in the second window and on the transparent platen.

11. The scanner according to claim 1, wherein the first sheet is adjacent or close to the second sheet so that the scanning module scans the image of the document through the second sheet.

12. The scanner according to claim 1, wherein a height difference is formed between the first sheet and the second sheet, and when the document flies across the height difference, a part of the document, which is not in friction contact with the transparent platen, the first sheet and the second sheet, functions as an image acquiring region, so that the scanning module scans the image of the document through the image acquiring region.

* * * * *